United States Patent [19]

Almquist

[11] 3,921,664
[45] Nov. 25, 1975

[54] VACUUM POWERED BALL VALVE FUEL CONTROL

[76] Inventor: Edgar W. Almquist, Milford, Pa.

[22] Filed: Feb. 26, 1974

[21] Appl. No.: 446,069

[52] U.S. Cl. ............ 137/553; 137/505.12; 251/61.3
[51] Int. Cl.² ......................................... F16K 37/00
[58] Field of Search................ 251/61.2, 61.3, 61.5; 137/553, DIG. 2, DIG. 8, 505.12, 505.46, 137/484.8

[56] References Cited
UNITED STATES PATENTS

| | | | |
|---|---|---|---|
| 1,461,662 | 7/1923 | Kawamura | 137/DIG. 8 |
| 1,819,452 | 8/1931 | Wright | 137/DIG. 2 |
| 2,288,733 | 7/1942 | Niesemann | 137/484.8 |
| 2,698,226 | 12/1954 | Peduzzi | 137/505.46 X |
| 2,775,981 | 1/1957 | Zonker | 137/505.12 |
| 2,890,713 | 6/1959 | Semon | 137/484.8 |
| 3,282,293 | 11/1966 | Barger | 137/DIG. 2 |
| 3,363,412 | 1/1968 | Fischer et al. | 251/61.3 X |

Primary Examiner—Henry T. Klinksiek

[57] ABSTRACT

The invention provides a vacuum powered motor device which can be inserted in the fuel line of a motor vehicle between the fuel pump and the carburetor. The device comprises a valve having an inlet pipe and an outlet pipe with a fuel valve diaphragm vacuum chamber therebetween. When the fuel flows into the inlet pipe, the fuel flow causes the diaphragm to be moved downwardly, thereby freeing a passage across which which the diaphragm sits. The vacuum created in the energy chamber under such conditions causes the diaphragm to freeze against the action of resilient means such as a coil spring which thereby controls the precise amount of fuel passing into the valve chamber and thereafter through the outlet port to the carburetor. With this construction there is a steady even flow with the desired amount of fuel.

8 Claims, 4 Drawing Figures

U.S. Patent Nov. 25, 1975 3,921,664
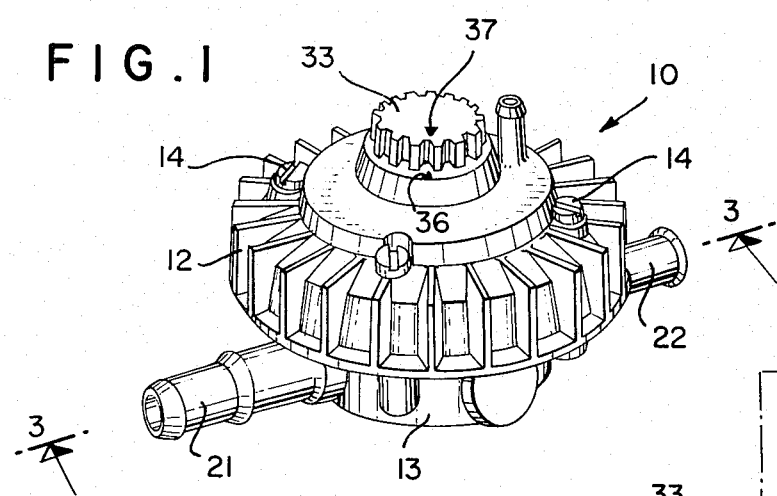
FIG. 1
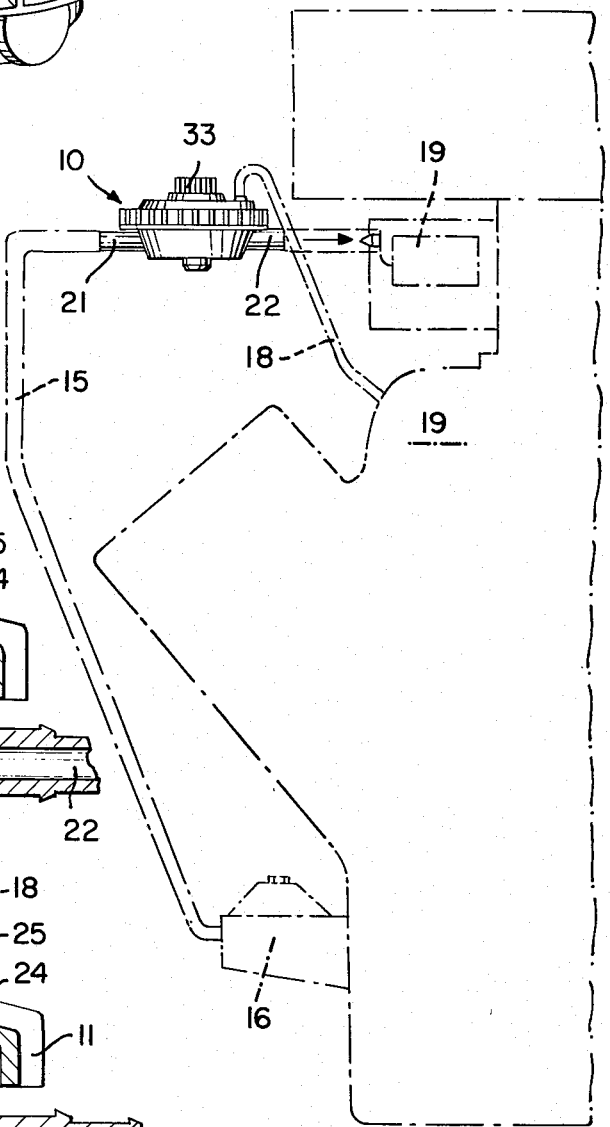
FIG. 2
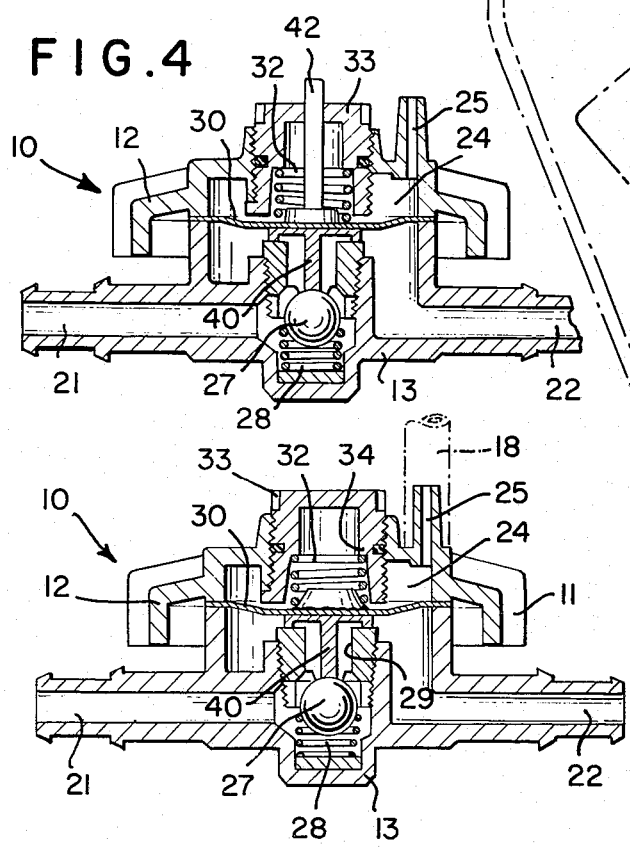
FIG. 4
FIG. 3

VACUUM POWERED BALL VALVE FUEL CONTROL

BACKGROUND OF THE INVENTION

Heretofore, various proposals have been made to provide automatic fluid metering valves. Some of them are tedious and time consuming to install, requiring installation at the time of construction of the vehicle or the like in which the motor valve is to be utilized. Others, while installable as an accessory unit are complex and require adjustments to many areas outside of the line. Still, others, have been constructed so that the valve itself is not in an even state for the passage of fluid and consequently disadvantageous conditions occur during the static state, for example, fuel starvation may occur. Furthermore, because of the prior construction the valves are not positive in operation and did not derive the automatic portions of fuel pressure and flow in relation to engine load and speed.

Furthermore, such other devices were not easily or quickly adjustable to provide for appropriate regulation of varying conditions or with different vehicles while achieving great savings in fuel.

In addition, it was difficult, if not impossible to ascertain whether the valves for metering the fluid were operational.

SUMMARY OF THE INVENTION

The present invention has overcome the aforesaid difficulties. In essence, it provides a vacuum powered motor device which combines the features of a two dimensional fuel pump, pulsation amplifier and an adjustable fuel pressure regulator. As a result of the balanced arrangement fuel can flow into the engine carburetor in automatic proportion in accordance with the engine load and speed. In addition, adjustment means are provided to allow the user to adjust the pressure for substantially all of the type of performances desired. Thus, allowances can be made for changes in temperature, altitude and type of vehicle in which the valve is utilized, as well as in conjunction with the desired flow and resultant engine performance the user requires in accordance with the load factor on the engine. The valve of the present invention may be quickly and simply installed on any vehicle in an extremely short period of time at any point in the line between the fuel pump and the carburetor.

In addition, means are provided in which the operational qualifications of the valve are available and immediately readable by the user at all times. These results are accomplished by a compact unit including an inlet and an outlet line intermediate of which are disposed in perfect proportion a balance of springs, ball diaphragm and vacuum chamber. The structure is such that a ball valve is seated on a spring in the line adjacent to the inlet port. The ball, under the pressure of the coil spring on which it is seated, rests against the opening in the line between the inlet and outlet ports to seal the line when the vehicle is not operating. Seated at the top of the line is a diaphragm which under the pressure of another coil spring is normally disposed adjacent to the line of flow of the fluid between the inlet and outlet ports. The tension of the coil springs about the diaphragm is adjustable by a rotatable knob carrying the coil spring. A connection is made to the engine manifold vacuum which provides for vacuum conditions effected primarily by engine load, thus influencing the position in movement of the diaphragm which controls thereby the flow of liquid into a full even flow of fuel to the carburetor, no matter what may be the conditions of pressure and engine power load.

In operation, when fuel begins to flow through an inlet port the ball valve is moved against the action of the spring downward to expose the opening in the line between the inlet and outlet ports. At the same time, the vacuum created in the energy chamber above the diaphragm causes the diaphragm to establsh a stable position against the action of the coil spring carried by the pressure adjusting means and fluid will flow through the outlet port into the carburetor in a full and even flow. As lesser fluid is required, the diaphragm will shift into such position as to control the rate of flow based upon the proportional balance achieved by the present invention between the tension of the tension spring and the amount of vacuum present in the energy chamber, all of which completely regulate the amount of fuel passing through.

As a result, carburetor efficiency and the fuel mixture is improved which reduces carbon accumulation in the engine. Great fuel economy is achieved in this manner.

The valve is easily and simply installable in the line that exists between the fuel pump and the carburetor by simply opening the line and then connecting the valve control between the points of brake and securely attaching it in this part of the line in any suitable manner. While, the invention will be described in some detail, it is to be understood that the description is merely to facilitate an understanding thereof and is in no way intended to limit the scope of the present invention.

BRIEF DESCRIPTION OF THE DRAWINGS

FIG. 1 is a perspective view of the vacuum powered ball fuel control of the present invention.

FIG. 2 is a side view showing the position of the vacuum powered ball valve in the line between the fuel pump and the carburetor of a vehicle.

FIG. 3 is a sectional view taken along the lines 3—3 of FIG. 1.

FIG. 4 is a partially broken sectional view of the vacuum powered ball fuel control including lines for indicating the operability of the valve.

DETAILED DESCRIPTION OF THE INVENTION

As shown in the drawings, the vacuum powered ball valve fuel control 10 of the present invention comprises a housing 11 having two segments 12 and 13. The segments are secured together by bolts 14, although, of course, any other form of suitable attaching means may be utilized. The fuel control device of this invention is disposed within the line 15 between the fuel pump 16 and the carburetor 17. A vacuum line 18 leads to the fuel control device 10 from the area of the engine manifold 19. Thus, it may be seen that the vacuum powered fuel control of the present invention may be simply and easily installed with a minimum of difficulty in the line existing between the fuel pump 16 and the carburetor 17.

The fuel control device 10 is provided with an inlet passage 21 and an outlet passage 22 which are connected in the line 15 leading from the fuel pump to the carburetor and consequently fuel flows therethrough. As shown in FIG. 3, the fuel control 10 comprises an energy chamber 24 in which a vacuum is formed from line 18 through passage 25. A ball 27 is seated upon spring means 28 below an intermediate passage 29 leading from the inlet passage 21 to the outlet passage 22. An upper adjusting spring 32 is disposed within an adjusting knob 33 which engages the shoulder 34 within the knob. Thus, the spring 32 may be adjusted to any desired tension by easily rotating the knob in one direction or the other, causing it to move upwardly or downwardly on threads within the housing to any desired position indicated by the indicia on the housing 36 and the arm 37 on the knob 32 itself. This movement of this tuning knob 33 causes pressure on the spring 32 to be comprised as desired thereby controlling the operation of the diaphragm 30 as hereinafter described. A movable stem 40 is located between the diaphragm 30 and the ball 27. The stem has a concave base fitted around the ball with a light tension bottom spring 28 and the arrangement is such that when the diaphragm is lifted it carries the stem 40 with it and when the diaphragm moves downwardly, the stem presses against the ball urging the ball downwardly to free the passage 29.

The operation of the fuel control device of the present invention is so constructed as to feed the fuel and required volume of fuel to the carburetor at optimum pressure for correct airfuel mixture under virtually all speeds, driving and load conditions.

The ball 27, under pressure of the resilient means in which a spring 28 is located in position where it tends to close the line opening into intermediate passage 29 when the vehicle is idling, coasting, decelerating, or under light load operating conditions. When the engine is started, fuel from the pump 16 passes through line 15 to the inlet passage 21. The ball 27 is thereupon moved downwardly against the action of the spring 28 to expand the opening to the passage 29. At the same time in a balanced condition, the vacuum created in the energy chamber 24 causes the diaphragm 30 to move upwardly against the action of the resilient means of spring 32. The action expands the opening at the upper end of the intermediate passage 29 and the fluid flows to the outlet passage 22 and into the carburetor. The arrangement is so balanced that only the precise amount of fuel required passes to the carburetor for varying speed and load conditions. This is achieved by the balanced relation between the pressure of spring 32 and the vacuum pressure in energy chamber 24 in corelation to the effect of the spring 28 on the ball valve 27.

The knob 33 is hollow and may be rotated in one direction or the other. It will be understood that such rotation can cause greater or lesser pressure to be exerted on spring 32. As a consequence the unique tuning knob arrangement permits the user to adjust the pressure to obtain whatever desired power and acceleration he feels necessary. When the pressure on spring 32 is increased, greater engine power and faster acceleration is possible. However, when the tension of spring 32 is lessened, the pressure on the diaphragm is decreased and maximum fuel economy is obtained.

In achieving the balanced relationship, surges of fuel against the underside of the diaphragm 30 causes the stem 40 to move upwardly and the valve closes. With reduced fuel pressure the valve can open again and full and even flow of fuel can be delivered to the carburetor.

As shown in FIG. 4, an indicator 42 may be carried within a passage in the knob 33. The indicator rests on the diaphragm 30 and its position will show the operability of the fuel pump and the pressure effect of the fuel control device. The position of the indicator 42 may also act as a trouble shooting tool or means of indicating whether or not the fuel pump is operating at maximum efficiency. Thus, there is accomplished an easily attachable unit for all vehicles which automatically controls the amount of fuel delivery to the carburetor. While the invention has been described in detail in connection with an embodiment thereof many variations and modifications may be made without departing from the spirit of this invention as defined in the appended claims.

What is claimed is:

1. A vacuum powered ball valve fuel control device comprising:
   a housing;
   a vacuum chamber within said housing;
   a fluid inlet passage to said chamber for providing fuel under pressure;
   a fluid outlet passage from the said chamber;
   a passage between said fluid inlet and said fluid outlet passage;
   first resilient means below said intermediate passage;
   a ball seated on said first resilient means and urged by said resilient means into position in proximity to the opening on one end of said intermediate passage;
   a flexible diaphragm disposed across said intermediate passage;
   second resilient means supported within the chamber and having one part thereof free for normally exerting pressure on said diaphragm tending to close the line opening into the intermediate passage;
   said ball moving in the first opening against the action of said first resilient means to close the opening at one end of said intermediate passage under the pressure of fuel from said inlet passage to permit the fuel to flow toward said outlet passage.

2. The invention as defined in claim 1 in which said flexible diaphragm is supported to move said second resilient means when said diaphragm is flexed by vacuum conditions in the energy chamber closing the opening at the other end of said intermediate passage to permit and even flow of fuel to the other chamber.

3. The invention as defined in claim 2 including a movable stem supported on the upper surface of the diaphragm between the diaphragm and the ball.

4. The invention as defined in claim 3 in which the movable stem has a concave portion within which said ball is adapted to seat.

5. The invention as defined in claim 1 including a hollow knob supported in the housing for mounting one end of said second resilient means.

6. The invention as defined in claim 5 in which said hollow knob is rotationally adjustable to vary the tension of said second resilient means.

7. The invention as defined in claim 6 including indicia on the housing and the knob to indicate by relative position the tension factor of said secure resilient means.

8. The invention as defined in claim 6 in which the knob has a passage extending therethrough, and an indicator means having one end extending through said passage and the other end seated on said diaphragm.

* * * * *